(12) United States Patent
Studholme

(10) Patent No.: US 6,537,475 B1
(45) Date of Patent: *Mar. 25, 2003

US006537475B1

(54) MELT EXTRUSION SPINNING POLYAMIDE FIBERS WITH SULFONATED REAGENT

(75) Inventor: Matthew Benjamin Studholme, Abingdon, VA (US)

(73) Assignee: Prisma Fibers, Inc., Bristol, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/522,123

(22) Filed: Aug. 31, 1995

(51) Int. Cl.⁷ ............... B32B 31/10; D01D 5/10; D02G 1/00; D02G 3/02

(52) U.S. Cl. ............ 264/172.18; 57/351; 57/362; 264/103; 264/168; 428/85; 525/420

(58) Field of Search ............ 525/420; 57/351, 57/362; 264/103, 168, 172.18; 428/85

(56) References Cited

U.S. PATENT DOCUMENTS

| | | | |
|---|---|---|---|
| 3,142,662 A | 7/1964 | Huffman | 260/78 |
| 3,184,436 A | 5/1965 | Magat | |
| 3,296,204 A | 1/1967 | Caldwell | 260/49 |
| 3,365,427 A | 1/1968 | Ballentine et al. | 260/78 |
| 3,389,549 A | 6/1968 | David | 57/140 |
| 3,409,596 A | 11/1968 | Unger et al. | 260/78 |
| 3,440,226 A | 4/1969 | Crovatt | 260/78 |
| 3,448,087 A | 6/1969 | Ballantine et al. | 260/78 |
| 3,542,743 A | 11/1970 | Flamand | 260/78 |
| 3,553,286 A | 1/1971 | Murata et al. | 260/857 |
| 3,565,910 A | 2/1971 | Elbert et al. | 260/30.8 |
| 3,640,942 A | 2/1972 | Crampsey | 260/37 N |
| 3,846,507 A | 11/1974 | Thomm et al. | 260/857 TW |
| 3,898,200 A | 8/1975 | Lofquist | 260/78 L |
| 3,923,749 A | 12/1975 | Howell | 260/78 L |
| 4,083,893 A | 4/1978 | Lofquist et al. | 260/857 UN |
| 4,097,546 A | 6/1978 | Lofquist | 260/857 UN |
| 4,303,577 A | 12/1981 | Ridgway et al. | 260/45.75 C |
| 4,374,641 A | 2/1983 | Burlone | 8/557 |
| 4,391,968 A | 7/1983 | Merani et al. | 528/321 |
| 4,579,762 A | 4/1986 | Ucci | 428/95 |
| 4,680,212 A | 7/1987 | Blyth et al. | 428/97 |
| 4,780,099 A | 10/1988 | Greschler et al. | 8/115.6 |
| 5,108,684 A | 4/1992 | Anton et al. | 264/176.1 |
| 5,141,692 A | 8/1992 | Shridharani et al. | 264/210.6 |
| 5,145,487 A | 9/1992 | Hangey et al. | 8/557 |
| 5,164,261 A | 11/1992 | Windley | 428/364 |
| 5,236,645 A | 8/1993 | Jones | 264/78 |
| 5,279,899 A | 1/1994 | Asrar | 428/458 |

FOREIGN PATENT DOCUMENTS

| | | |
|---|---|---|
| DE | 4309436 | 9/1994 |
| EP | 035051 | 9/1981 |
| EP | 373655 | 6/1990 |
| EP | 421971 | 4/1991 |
| EP | 470614 | 2/1992 |
| EP | 517203 | 12/1992 |
| GB | 901938 | 7/1962 |
| GB | 901939 | 7/1962 |
| GB | 1205563 | 9/1970 |
| JP | 5-086287 | 4/1993 |
| WO | 92/08828 | 5/1992 |
| WO | 93/19239 | 9/1993 |

OTHER PUBLICATIONS

Derwent accession No. 94–303668/38 for German Patent No. 4,309,436; Sandoz–Patent–Gmb H, Sep. 1994.*

* cited by examiner

Primary Examiner—Robert E. L. Sellers
(74) Attorney, Agent, or Firm—Dykema Gossett PLLC

(57) ABSTRACT

An acid dye stain-resistant fiber-forming polyamide composition comprising a fiber-forming polyamide and a reagent, at least a portion of which associates with free acid dye sites in the polyamide, thereby disabling the acid dye sites in fibers formed from the composition from taking up acid dye stains; a masterbatch concentrate for addition to a fiber-forming polyamide to form an acid dye stain-resistant fiber-forming polyamide composition comprising a carrier compatible with the fiber-forming polyamide combined with an amount of the above reagent in excess of that desired in the acid dye stain-resistant fiber-forming polyamide; as well as fibers and articles of manufacture prepared therefrom.

20 Claims, No Drawings ature. Gradual removal of the coating will also occur during cleaning with water and detergents. Fibers used for carpet applications may be regularly cleaned with alkaline-based cleaning agents. SAC topical coatings are easily removed using these types of cleaning agents. The topical coating will also be gradually removed during normal wear of the fiber in its chosen application. In addition to their removal during use and maintenance, SACs generally have inferior resistance to light, oxides of nitrogen, and bleach, the latter of which is commonly used for the cleaning of industrial textiles and carpets. Also, the base color of SACs is not colorless and thus may change the shade of the color of the yarn.

It is an object of the present invention to provide a novel and highly advantageous approach for imparting stain resistance to fibers formed from polyamides.

US 6,537,475 B1

MELT EXTRUSION SPINNING POLYAMIDE FIBERS WITH SULFONATED REAGENT

BACKGROUND OF THE INVENTION

1. Field of the Invention

The invention relates to stain-resistant polyamide compositions and fibers and articles of manufacture formed therefrom.

2. Description of the Prior Art

Textile and carpet yarns prepared from polyamide fibers are subject to staining by a variety of foods, drinks and many other compositions with which it comes in accidental contact. The uptake of acid dye stains from, for example, soft drinks, is a particularly vexing problem for polyamide fibers due to the availability therein of acid dye sites such as amine end groups and amide linkages. Several methods have been suggested for enhancing the resistance of polyamide fibers to acid dye stains.

One approach is to apply a so-called "stain blocker" coating to the surfaces of polyamide fibers to prevent access to the acid dye sites therein by the acid dye staining composition. An example of such a method is illustrated by U.S. Pat. No. 5,145,487 which discloses coating the fibers with sulfonated aromatic condensates (SACs). Similar proposals are suggested in U.S. Pat. Nos. 4,680,212 and 4,780,099.

Another approach is to form the fibers from polyamides prepared by copolymerizing monomers, some of which contain sulfonate moieties. Typical of such systems are those disclosed in U.S. Pat. Nos. 3,542,743; 3,846,507; 3,898,200 and 5,108,684.

U.S. Pat. No. 4,374,641 relates to pigment concentrates made using sulfonated polymers as carrier resins including the highly sulfonated polyamides disclosed in U.S. Pat. No. 3,846,507. U.S. Pat. No. 5,236,645 represents an improvement on the invention claimed in U.S. Pat. No. 4,374,641.

Fibers are generally prepared from polyamides by meltspinning. Sulfonate containing copolymers generally have higher melt viscosities than non-sulfonate containing copolymers for equivalent relative solution viscosities which limits the extent of polymerization which can be achieved in batch autoclave reaction vessels due to the retardation thereby of the rate of polymerization, as well as its hindrance of effective discharge of the polymerized melt from the reactor. In addition, the presence of sulfonates which have surfactant properties promotes excessive foaming during the melt polymerization process resulting in poor agitation of the reaction mixture and non-uniformity of product.

Yarns having different depths of color require different levels of stain protection. Thus, light shaded colors show the presence of stains more than darker colors. It would be advantageous, therefore, to be able to provide different levels of stain resistance to polyamides depending upon the ultimate yarn color without having to provide a separate polyamide feedstock for optimum formulation of each color yarn.

An additional disadvantage associated with sulfonate containing polyamide copolymers is that they are generally more difficult to dry than sulfonate-free polyamides due to the hygroscopic nature of sulfonate groups.

Polyamides that are topically coated to give stain resistance to the fiber, e.g., with SACs, have the disadvantage that the topical coating is removed during use and mainte-

SUMMARY OF THE INVENTION

The above and other objects are realized by the present invention, one embodiment of which comprises an acid dye stain-resistant fiber-forming polyamide composition comprising:

a. a fiber-forming polyamide; and b. a reagent at least a portion of which associates with free acid dye sites in the polyamide, thereby disabling the acid dye sites in fibers formed from the composition from taking up acid dye stains.

Another embodiment of the invention relates to a masterbatch concentrate for addition to a fiber-forming polyamide to form the above-described acid dye stain-resistant fiber-forming polyamide composition, the concentrate comprising a carrier material compatible with the fiber-forming polyamide, preferably a polyamide, combined with an amount of the reagent in excess of that desired in the acid dye stain-resistant fiber-forming polyamide such that addition of the concentrate to the compatible fiber-forming polyamide results in the desired level of stain resistance.

An additional embodiment of the invention concerns stain-resistant fibers formed from the above-described polyamide compositions.

Further embodiments of the invention comprise articles of manufacture prepared with fibers according to the invention such as textiles and carpets.

A final embodiment of the invention relates to a method of forming acid dye stain-resistant fibers comprising forming a polyamide composition according to the present invention into fibers by, for example, melt spinning.

DETAILED DESCRIPTION OF THE INVENTION

The terms below have the following meanings herein, unless otherwise noted:

"Reagent" refers to any chemical compound, composition or material which associates (as that term is defined below) with the free acid dye sites in a fiber-forming polyamide to thereby render them unavailable for association with an acid dye, which reagent is incapable itself of associating with or taking up the acid dye.

"Association" refers to the chemical reaction or bonding between the reagent and the free acid dye sites in the polyamide which results in prevention of "taking up" of the acid dye by the polyamide, i.e., staining. The association may take the form of a chemical reaction or an acid-salt formulation. Additional types of association include hydrogen bonding, dipole-dipole interaction, Van der Waals forces and coordination complexing.

"Acid dye stain" refers to any material or composition which functions as an acid dyestuff by reacting with the free dye sites in polyamides to substantially permanently color or stain the latter.

The term "acid dye sites" refers to those basic sites in polyamides (e.g., amine end groups, amide linkages, etc.) which react or associate with acid dyes, thereby resulting in a stain bonded thereto.

"Disabling" the acid dye sites from taking up acid dye stains refers to the effect of the association between the reagent and the acid dye sites which renders the latter less capable of associating with acid dyes such as, for example, those in soft drinks, tomato-based products, etc., which result in staining.

The present invention is predicated on the discovery that optimum levels of resistance to acid dye stain may be imparted to polyamide fibers by compounding certain reagents with fiber-forming polyamide compositions subsequent to polymerization of the polyamide and prior to the formation of the fibers. The invention thereby enables avoidance of the above-enumerated disadvantages associated with coating the polyamide fibers with stain resistant SACs and with formation of the polyamides by copolymerizing sulfonate containing monomers.

The selection of a suitable non-acid dyeable reagent having at least one functional group capable of associating with the acid dye sites available in fiber-forming polyamides, thereby rendering those dye sites unavailable for association with acid dye stains, enables the formation of stain-resistant fibers having predetermined and optimum levels of stain resistance not obtainable by the methods and systems of the prior art.

Suitable such reagents include those having at least one functional moiety which preferentially associates with the active acid dye sites in the fiber-forming polyamide and, additionally, contains at least one sulfonyl group. The reagent, of course, should be otherwise substantially inert with respect to the fiber-forming properties of the polyamide.

Exemplary of such reagents are those having the formula:

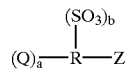

wherein:

Q and Z are moieties which associate with the acid dye sites in the polyamide;

a is an integer from 0 to 2;

b is an integer from 1 to 4; and

R is aliphatic, aromatic or alicyclic.

The reagent is selected so as to preferentially associate with the amine end group and/or amide linkage acid dye sites in the polyamide. Preferably, a substantially colorless reagent is selected unless, of course, the reagent is expected to contribute a desired color to the fibers prepared from the polyamide.

The associative functional moieties, Q and Z, may comprise any chemistry that will associate with amine or amide linkages, providing that the functionality does not promote increased stain uptake or otherwise deleteriously impact on the ultimate polyamide composition or articles manufactured therefrom. Thus, Q and Z are preferably combined to form carboxylic anhydride groups or are, individually, carboxylic acid groups or alkali metal, alkaline earth metal or transition metal salts thereof; isocyanate groups; epoxy groups; ester groups and α,β diketone groups. Thio functionalities are generally not employed due to their promotion of yellowing in fibers prepared from polyamide compositions containing them when subjected to light, heat, oxides of nitrogen, etc.

The backbone of the reagent or R may be any suitable aliphatic, aromatic, alicyclic or heterocyclic structure such as phenyl, naphthyl, alkyl (straight or branched chain), cycloalkyl including substituted cycloalkyls, aralkyl, alkenyl and cycloalkenyl.

Exemplary of such reagents are 5-sulfoisophthalic acid, 3-sulfobenzoic acid, 4-(acetoacetamido)benzene sulfonic acid, 4-isocyanatobenzene sulfonic acid, 4-(2,3-epoxypropyl)benzene sulfonic acid, dimethyl-5-sulfoisophthalate, 3,5-di-(2,3-epoxypropyl)benzene sulfonic acid, 3,5-di-isocyanatobenzene sulfonic acid, 3,5-di-(acetoacetamido)benzene sulfonic acid, the sodium and lithium salts of all of the above, and sodium or lithium salt of sulfophthalic anhydride.

The invention is applicable to provide acid dye stain resistance in any fiber-forming polyamide such as nylon-6, nylon-66, MXD-6, nylon-11, nylon-12, nylon-69, the amorphous polyamides such as the copolymer of terephthalic acid and trimethylhexamethylene diamine. Other suitable amorphous polyamides include nylon-6,I (a copolymer of hexamethylene diamine and isophthalic acid), terpolymer of lauryllactam, isophthalic acid and bis(4-amino-3-methylcyclohexyl)methane and polynorbornamide.

The composition may include any of the conventional adjuvants for enhancing the formation of fibers from the polyamide composition such as anti-oxidants, stabilizers, colorants, processing aids, anti-static agents, flame retardants, fillers, nucleating agents, anti-microbials, melt viscosity enhancers or mixtures thereof. Catalysts and/or reducing agents can be added to enhance the association of the reagent with the fiber-forming polyamide. Examples of suitable catalysts/reducing agents include salts of hypophosphites such as sodium hypophosphite, ammonium hypophosphite and manganese hypophosphite, or other phosphorus-containing organic compounds such as phenylphosphinic acid, polyphosphoric acids and triphenyl phosphite.

The compositions are prepared by combining the reagent (s), polyamide(s) and, optionally, adjuvant(s) under conditions which ensure association between the functional moieties of the reagent and the free acid dye sites in the polyamide(s). Preferably, the polyamide(s) and reagent(s) are combined by melt blending at temperatures above the melting point of the polyamide(s), but below the decomposition temperature of the reagent(s). The reagent(s) and polyamide(s) may be combined in a pre-fiber spinning compounding operation or directly in the fiber melt spinning stage. Product fibers made according to the invention show durable stain-resistant properties equivalent or superior to those produced according to the prior art methods without the consequent disadvantages attendant thereto.

The reagents (and adjuvants, if any) may be combined with the polyamide(s) in any suitable form such as powdered, pelletized, encapsulated, etc. The polyamide(s) may be employed as powder, granules or pellets. The reagent(s) and adjuvant(s) are preferably combined with the polyamide(s) employing a melt extruder and, most preferably, a screw-type extruder. Optimally, a twin-screw extruder of the fully intermeshing type with both screws rotating in the same direction (co-rotating) is employed, although other types of twin-screw extruders may be used such as counter-rotating and/or non-intermeshing types. Single screw extruders may also be successfully employed. The extruder preferably has a barrel length to screw diameter ratio of about 24:1; however, it will be understood that any suitable ratio may be employed depending upon the parameters of the particular compounding process contemplated.

While it is in no way intended to limit the invention by the soundness or accuracy of any theory set forth to explain the nature of the invention, it is postulated that, during the processing step(s), the stain-resistant reagent at least partially associates with, or reacts with, reactive chemical groups or acid dye sites on the polyamide, such as amine end groups or amide linkages. Removal of volatiles from the compounding mixture aids this association and/or reaction with the polyamide. This removal of volatiles is achieved preferably by the presence of one or more vents on the extruder barrel, although venting is not a requirement for the process of the invention. When a single vent is used with an extruder of a length to diameter ratio of 24 to 1, the vent port is suitably located approximately 19 screw diameters down the length of the barrel. The optimum position of the vent port is determined by the extruder screw profile used. The extraction of volatiles through the vent port is preferably vacuum assisted with a vacuum level of greater than 10 in. Hg and preferably greater than 20 in. Hg. The rate of devolatilization can be assisted through substantially dry nitrogen gas injection through an inlet port located either upstream or downstream of the vent port. Under this situation, a lower vacuum level may be acceptable. Additional ways of promoting the association and/or reaction with the polyamide are through controlled drying of the feedstocks, addition of water-scavenging additives, or a combination of these methods.

The stain-resistant additives and the polyamide resin are preferably fed to the extruder in a pre-dried form with a controlled moisture level. The moisture levels of both the additive and the resin are less than 3,000 ppm and are preferably less than 500 ppm. When drying both of these materials, an inert gas drying atmosphere is preferred. The reagent and the resin may be either fed to the extruder as a blend of the two materials using a single feed hopper or by using separate feed hoppers of a suitable type such as gravimetric or volumetric feeders. Additives to enhance the relative viscosity (RV) of the concentrate can also be added at this stage. When a blend of the materials is used, a double cone tumbler blender is preferred for preparation of the blend, although other types of blenders may be used.

The extruder temperature profiles used and the desired melt temperature during the mixing process will depend, as noted above, principally on the polyamide type and grade chosen. For example, when PA6 is utilized, the melt temperature preferred is between 240° C. and 260° C. and for PA66 the preferred melt temperature range is between 265° C. and 285° C. The optimum melt temperatures for these two resin types will depend on the grade employed.

A preferred embodiment of the invention relates to the preparation of a masterbatch concentrate of polyamide and reagent which can be blended with a suitable fiber-forming polyamide prior to or at the melt-spinning stage to achieve the desired level of stain resistance.

Only a small proportion of the reagent is reacted with the polyamide of the concentrate. The bulk of the reagent is dispersed/associated with the resin. It is desired that a proportion of the unreacted reagent in the concentrate becomes reacted/associated with the fiber-forming polyamide. Nylon copolymers are conventionally produced via condensation polymerization where water (or other small volatile molecule, depending on the chemistry) is generated as a by-product. In order to drive this equilibrium reaction forward, it is necessary to remove this water by-product from the system below the equilibrium water concentration. If this is achieved in the fiber spinning line, then association/reaction of the unreacted reagent in the concentrate with the fiber-forming polyamide will occur. In a conventional fiber spinning line, a non-vented extruder barrel is typically used, although vented extruders may be used. The water concentration can be reduced to below the equilibrium value by any of the methods discussed hereinabove.

The masterbatch concentrate may be prepared according to the methods described above employing levels of reagent up to about 50% by weight based on the weight of the polyamide.

Any suitable carrier compatible with the fiber-forming polyamide may be employed to prepare the masterbatch concentrate. Although it is preferred to utilize a polyamide carrier, it will be understood that any suitable polymer, polymer blend or other carrier material which is compatible with the fiber-forming polyamide may be employed. Suitable other carriers include polyesters and modified polyolefins. The polyamide used to prepare the masterbatch concentrate may be the same or different in chemical composition from that of the fiber-forming polyamide with which the concentrate is combined to produce the ultimate composition from which fibers according to the invention are formed.

When a stain-resistant concentrate or masterbatch is produced, the melt emerging from the die of the compounding extruder is stranded through a water batch to solidify the melt, followed by air drying of the strand to remove the bulk of the surface water, and pelletization. The concentrate pellets formed are then dried prior to fiber melt spinning to a moisture level of less than 3,000 ppm and preferably less than 500 ppm. This drying of the concentrate is preferably accomplished in an inert gas atmosphere. The concentrate is then mixed on the fiber melt spinning line with non-stain resistant polyamide resin feedstock, dried to a moisture level of less than 3,000 ppm and preferably less than 500 ppm, in the desired ratio depending on the level of stain resistance required in the fiber product. The fiber melt spinning process of a conventional type is used, familiar to those skilled in the art. Other additives such as colorants and stabilizers may be added during the fiber formation process.

The polyamide resin should have a relative solution viscosity of equal to or greater than 2.4 and preferably equal to or greater than 2.7. The relative viscosity of the resin is determined by first preparing 0.55% w/w solutions of the pre-dried polyamide in concentrated sulfuric acid (analytical grade, 96±0.5%). Solution flow times are determined in a Cannon-Ubbelhode size 2 viscometer suspended in a viscometer water bath controlled at 25° C.±0.02° C. The flow times of the sulfuric acid are also measured. The relative viscosity is calculated by dividing the flow time of sample solution by the flow time of the solvent. The polyamide resin should also have an amine end group (AEG) level of less than 60 equivalents per $10^6$ g and preferably less than 45 equivalents per $10^6$ g. The AEG level is determined by means of a potentiometric titration. A known weight of sample is dissolved in m-cresol and titrated against 0.1 M perchloric acid in methanol. A blank titration is also carried out on the m-cresol and used to correct the sample titre.

In the following examples, a standard test is used to evaluate the stain resistance of the yarn formed. It involves the use of an acidified solution of FD&C Red 40 dye which is present in the soft drink cherry-flavored Kool-Aid® commercially sold by Kraft General Foods, Inc.

Typically, 0.1000 g±0.0030 g of FD&C Red 40 dye (CI Food Red 17) is dissolved in 1,000 cm$^3$ of distilled water. The pH of the dye solution is adjusted to between 2.80 and 2.90 by making small additions of citric acid of technical grade or better. The pH adjusted solution is allowed to reach room temperature, i.e., 21° C.±1° C., prior to use.

1.0000±0.0010 g of yarn is placed in 50 cm$^3$ of the Red 40 solution in a 100 cm$^3$ glass beaker and the yarn is briefly stirred in the solution to ensure that it is fully wetted by the solution. The beaker is allowed to stand for 60 minutes without any further agitation.

The yarn is washed for 120 seconds under free-flowing hot tap water, that is at a temperature of 40–50° C. The yarn is then dried by initially blotting with a clean white paper towel to remove the bulk of the surface moisture, followed by allowing it to sit at room temperature for at least 16 hours.

The stain resistance of the yarn is-determined by visual comparison to the AATCC Red 40 Stain Scale, which is available from the American Association of Textile Chemists and Colorists (AATCC), Research Triangle Park, N.C. The scale consists of ten film squares colored with gradually increasing strengths of FD&C Red 40 numbered from 1 to 10, with 1 being the strongest color and 10 being colorless. The unstained yarn is placed underneath the colored portions of the scale and the stained yarn is placed underneath the colorless portion of the scale and viewed under daylight or equivalent illuminant. The light should be incident upon the surfaces at an angle of 45°±5° and the viewing direction should be 90°±5° to the plane of the surfaces. The stained yarn is compared to the unstained yarn placed under the closest numbered colored square of the stain scale so that the best color match is obtained. If the color of the stained yarn falls between two squares on the scale, then half grades are used. The number of this colored square, or squares if the match falls between two squares, is called the Stain Rating.

The invention is illustrated by the following non-limiting examples.

EXAMPLE 1

A PA66 resin, polymerized from the salt of adipic acid and hexamethylene diamine, with an RV=2.7 and an AEG of 40 equivalents per 10$^6$ g was dried to a moisture level of less than 500 ppm and tumble blended with 1.5 wt. % of the lithium salt of 5-sulfoisophthalic acid (LiSIPA), also dried to a moisture level of less than 500 ppm. The dry blend was compounded in a vacuum vented 40 mm twin-screw extruder with a length-to-diameter ratio of 24:1. The screw speed was 249 rpm at a throughput rate of approximately 50 kg per hour. The melt temperature of the compound immediately prior to the melt exiting the extruder was measured at 269° C. The vacuum level, as measured directly above the vent of the extruder, was 22 in. Hg. The pelletized product produced was dried to between 400 and 500 ppm before melt spinning into a fiber of 1,850 denier with a filament count of 22 with a trilobal filament cross-section. The undrawn fiber produced was mechanically crimped at a 3.2 draw ratio to give a textured yarn. The stain rating of the yarn using the standard stain test described above was 5.5. The RV of the yarn was 2.54 with an AEG level of 21 equivalents per 10$^6$ g.

EXAMPLE 2

A PA66 resin with an RV of 3.2 and an AEG level of 27 equivalents per 10$^6$ g was compounded with 1.5 wt. % of LiSIPA, both dried to similar levels and compounded under similar extrusion conditions as in Example 1 above. The measured melt temperature was 274° C. and the vent vacuum level was 23 in. Hg. The compound was dried, spun and textured to give a yarn as per Example 1. The stain rating of the textured yarn using the standard stain test described above was 8.5. The RV of the yarn was 2.50 with an AEG level of 6 equivalents per 10$^6$ g.

EXAMPLE 3

A similar PA66 resin to that described in Example 1, also with an RV=2.7, was tumble blended with 10 wt. % of the sodium salt of 5-sulfoisophthalic acid (NaSIPA). The PA66 resin was pre-dried to a moisture level of 380 ppm and the NaSIPA was pre-dried to a moisture level of less than 300 ppm. Using the same extruder and similar extrusion conditions, the dry blend was compounded to give a pellet concentrate. The melt temperature was 269° C. and the vent vacuum level was 24 in. Hg. The concentrate was dried to a moisture level of 560 ppm and was blended with the same PA66 resin used to make the concentrate in a 15/85 ratio that was dried to a moisture level of less than 700 ppm. The dry blend was melt spun and textured in a manner similar to Example 1. The textured yarn produced had a stain rating of 5, a yarn tenacity of 2.9 g per denier and a % peak elongation of 37%.

EXAMPLE 4

A similar PA66 resin to that described in Example 1, but with an RV=3.2, was tumble blended with 3 wt. % of LiSIPA. The polyamide resin had been pre-compounded with copper, iodine and phosphorus containing compounds with 35 ppm copper, 1,200 ppm iodine and 100 ppm phosphorus. The polyamide resin had been pre-dried to a moisture level of less than 700 ppm. The LiSIPA was used in its undried form and had a moisture level of 7.0%. The PA66/LiSIPA blend was not pre-compounded prior to introduction to the fiber spinning line. The blend was produced into a textured yarn in a manner similar to Example 1. The textured yarn had a stain rating of 8 with a yarn tenacity of 3.4 g per denier and a % peak elongation of 48%.

EXAMPLE 5

A PA6 resin, polymerized from ε-caprolactam without chain termination, with an RV=2.7 and an AEG level of 35 equivalents per 10$^6$ g, was dried to a moisture level of 650 ppm. The resin was tumble blended with 3% of undried LiSIPA. The PA6/LiSIPA blend was compounded on the same extruder and under similar extrusion conditions to Example 1 to give a pelletized compound. The vent vacuum level during compounding was measured at 16 in. Hg with a melt temperature of 252° C. The compound was dried to a moisture level of less than 1,000 ppm to produce a textured yarn in a manner similar to Example 1 using process conditions suitable for PA6 that are familiar to those skilled in the art. The stain rating of the textured yarn produced was 6.

EXAMPLE 6

A PA6 resin, similar to that used in Example 5 but with an RV=3.3 and an AEG level of 27 equivalents per 10$^6$ g, was pre-dried to a moisture level of 600 ppm. The resin was tumble blended with 3% of undried LiSIPA and 1% of undried sodium hypophosphite. The blend was compounded as per Example 1 with a measured vacuum vent level of 14 in. Hg and a melt temperature of 253° C. The compound was dried to a moisture level of less than 1,000 ppm prior to producing a textured yarn in a manner similar to Example 5. The stain rating of the textured yarn produced was 8.

EXAMPLE 7

A PA66 resin similar to that used in Example 2 was compounded in a similar way to Example 2, except that no venting was conducted during the extrusion step. Poor strandability of the extruded compound was experienced. The compound was dried, spun and textured to give a yarn as per Example 1. The stain rating of the textured yarn using the standard stain test described above was 5.5 with an RV of 2.70.

EXAMPLE 8

A PA66 resin similar to that used in Example 1, but with an AEG level of 57 equivalents per $10^6$ g, was processed as described in Example 1. The stain rating of the textured yarn using the standard stain test described above was 4 with an RV of 2.77.

The feed yarn for manufacture of synthetic textiles and carpets normally takes one of two forms: staple or continuous filament. Staple yarn is produced by spinning an undrawn yarn tow (a large bundle of filaments), that is drawn, mechanically crimped (textured), heat-set and cut into set lengths. The cut yarn is then carded followed by drafting to give a continuous staple yarn. Continuous filament yarn is spun and textured either as a single process or as a multi-step process. The filament bundle size for continuous filament yarn is often considerably smaller than that used for staple tow. The melt spinning portion for both staple and continuous filament yarn types is similar, i.e., molten resin with any desired adjuvants is compounded and fed by a screw extruder or other suitable melting device to a gear pump that forces the melt in a controlled and uniform manner through a melt filtration system and the fine capillaries in a spinneret, followed by air cooling to driven rolls to carry the fibers away from the face of the spinneret. The melting device used should be designed such that satisfactory mixing is achieved to present a substantially uniform melt to the gear pump/spinneret. The actual design will depend on the resin type and grade used and the nature of any adjuvants used. The cross-section of the capillaries in the spinneret is specifically designed for the fiber end use application and will influence the cross-section shape of the spun fiber. Typical shapes are round, deltoid and trilobal. Various types of texturing processes exist for crimping continuous filament including a stuffer-box, air-jet and false-twist texturing. Drawing of the yarn is typically a precursor of the texturing process.

There are typically three types of methods for forming fibers into apparel, textiles and carpets: (1) weaving, (2) knitting, including warp and circular types, and (3) non-woven techniques, including tufting. Woven fabrics consist of sets of yarns interlaced at right angles in established sequences on a loom. Knitting consists of forming loops of yarn with the aid of thin, pointed needles or shafts. As new loops are formed, they are drawn through those previously shaped. This interlooping and the continued formation of new loops produce knit fabrics. Non-woven fabrics consist of a web of staple or filament fibers held together either by application of a bonding or adhesive agent or by the fusing of fibers by application of heat. Tufting consists of inserting loops into an already formed backing fabric. The backing fabric may be of any type and composed of any fiber, including both natural and synthetic fibers such as jute and polypropylene. The yarn loops are inserted into the backing with needles. The loops can be cut or left uncut. They are held in place either by applying a special coating or by untwisting the tufted yarn and shrinking the backing fabric.

Fibers of the present invention may be combined into yarn according to methods and systems well known to those skilled in the art. Either the fibers or yarns prepared therefrom may be manufactured into novel textiles, carpets and other articles of manufacture requiring polyamides having enhanced resistance to staining by acid dyestuffs according to conventional, well known methods.

I claim:

1. A method of producing a stain-resistant yarn comprising the steps of:

(a) supplying into a melt extruder fiber-forming polyamide and a solid reagent for disabling free acid dye sites of said fiber-forming polyamide, said reagent consisting of a sulfonated acid, (b) melt compounding said sulfonated acid with said fiber-forming polyamide in said melt extruder and removing volatiles to form a fiber-forming polyamide composition;

(c) melt extrusion spinning said fiber-forming polyamide composition to form a yarn; and (d) drawing said yarn.

2. A method as defined in claim 1, further comprising, after step (d), the step of crimping said yarn to produce a textured continuous filament yarn.

3. A method as defined in claim 1, wherein said reagent is substantially colorless.

4. A method as defined in claim 1, wherein said sulfonated acid comprises a sulfonated aromatic acid.

5. A method as defined in claim 3, wherein said sulfonated aromatic acid is a derivative of 5-sulfoisophthalic acid.

6. A method as defined in claim 4, wherein said derivative of 5-sulfoisophthalic acid is a metal salt of 5-sulfoisophthalic acid.

7. A method as defined in claim 6, wherein said metal salt of 5-sulfoisophthalic acid is a metal salt including a metal selected from the group consisting of alkaline metal and alkaline earth metal.

8. A method as defined in 7, wherein said metal salt is a lithium salt of 5-sulfoisophthalic acid.

9. A method as defined in claim 7, wherein said metal salt is a sodium salt of 5-sulfoisophthalic acid.

10. A method as defined in claim 4, wherein said sulfonated aromatic acid comprises an acid selected from the group consisting of 3-sulfobenzoic acid.

11. A method as defined in claim 1, wherein said fiber-forming polyamide is selected from the group consisting of nylon 6, polyamide 6,6, nylon 6,9, nylon 11 and nylon 12.

12. A method as defined in claim 1, wherein said fiber-forming polyamide has relative solution viscosity equal to or greater than 2.7.

13. A method as defined in claim 1, wherein said fiber-forming polyamide has an amine end group level of less than 45 equivalents per $10^6$ g.

14. A method as defined in claim 1, further comprising adding an adjuvant with the said sulfonated reagent and said fiber-forming polyamide in step (a).

15. A method as defined in claim 14, wherein said adjuvant is selected from the group consisting of an antioxidant, a stabilizer, a colorant, a processing aid, a nucleating agent, an antimicrobial, an antistatic additive, a melt viscosity enhancer, a flame retardant, and mixtures thereof.

16. A yarn formed from the method of claim 1.

17. A carpet or floorcovering comprising a yarn of claim 16.

18. A textile article comprising a yarn of claim 16.

19. A method as defined in claim 1, including the step of applying vacuum to said melt extruder during melt compounding in step (b) to enhance removal of volatiles therefrom.

20. A method as defined in claim 1, wherein said solid reagent used in step (a) is predried to less than 3,000 ppm moisture.

* * * * *